United States Patent
Eriksson et al.

(10) Patent No.: US 9,215,724 B2
(45) Date of Patent: Dec. 15, 2015

(54) METHOD AND APPARATUS FOR DYNAMIC CONTROL OF TTI BUNDLING SIZES

(71) Applicant: Telefonaktiebolaget L M Ericsson (publ), Stockholm (SE)

(72) Inventors: Erik Eriksson, Linköping (SE); Xinghua Song, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 255 days.

(21) Appl. No.: 13/822,160

(22) PCT Filed: Dec. 17, 2012

(86) PCT No.: PCT/SE2012/051408
§ 371 (c)(1),
(2) Date: Mar. 11, 2013

(87) PCT Pub. No.: WO2013/169164
PCT Pub. Date: Nov. 14, 2013

(65) Prior Publication Data
US 2014/0056237 A1    Feb. 27, 2014

Related U.S. Application Data

(60) Provisional application No. 61/645,848, filed on May 11, 2012.

(51) Int. Cl.
| | |
|---|---|
| *H04L 12/855* | (2013.01) |
| *H04W 4/00* | (2009.01) |
| *H04B 7/212* | (2006.01) |
| *H04L 12/26* | (2006.01) |
| *H04W 72/00* | (2009.01) |
| *H04B 7/00* | (2006.01) |

(Continued)

(52) U.S. Cl.
CPC ............ *H04W 72/085* (2013.01); *H04L 1/0006* (2013.01); *H04L 1/0025* (2013.01);
(Continued)

(58) Field of Classification Search
CPC ..... H04W 72/085; H04L 1/0006; H04L 1/25; H04L 1/29; H04L 1/39; H04L 5/64; H04L 5/92

USPC ......... 370/252, 311, 329, 336, 345, 236, 348, 370/395.4; 455/452.1, 453, 509; 714/748
See application file for complete search history.

(56) References Cited

U.S. PATENT DOCUMENTS

| | | | | |
|---|---|---|---|---|
| 2008/0225783 | A1* | 9/2008 | Wang et al. | 370/329 |
| 2009/0175232 | A1* | 7/2009 | Kolding | 370/329 |

(Continued)

FOREIGN PATENT DOCUMENTS

| | | |
|---|---|---|
| EP | 2034757 A1 | 3/2009 |
| EP | 2265077 A1 | 12/2010 |

OTHER PUBLICATIONS

Unknown, Author, "On TTI bundling enhancements", 3GPP TSG-RAN WG1 #69, Tdoc R1-122013, Ericsson, ST-Ericsson, Prague, Czech Republic, May 21-25, 2012, 1-5.

(Continued)

*Primary Examiner* — Alpus H Hsu
*Assistant Examiner* — Camquyen Thai
(74) *Attorney, Agent, or Firm* — Murphy, Bilak & Homiller, PLLC

(57) ABSTRACT

In an example of the teachings disclosed herein, there are multiple signaling options available for triggering a bundled transmission by a wireless device, and a known association between the different signaling options and different TTI bundling sizes. A network node thus indicates to the wireless device which TTI bundling size is desired, based on choosing which signaling option it uses to trigger the bundled transmission. Such signaling allows for the use of variable TTI bundle sizes, i.e., dynamic control of the TTI bundle size used by the wireless device for transmission and yet does not impose signaling overhead or necessarily require new signaling messages or types. Higher layer signaling may be used to activate TTI bundling with implicit signaling then used to dynamically control the actual TTI bundle size used.

24 Claims, 5 Drawing Sheets

(51) Int. Cl.
*H04L 1/18* (2006.01)
*H04W 72/08* (2009.01)
*H04L 1/00* (2006.01)
*H04L 5/00* (2006.01)

(52) U.S. Cl.
CPC ............ *H04L1/0029* (2013.01); *H04L 1/0039* (2013.01); *H04L 1/189* (2013.01); *H04L 1/1819* (2013.01); *H04L 1/1864* (2013.01); *H04L 5/0064* (2013.01); *H04L 5/0007* (2013.01); *H04L 5/0092* (2013.01)

(56) References Cited

U.S. PATENT DOCUMENTS

2009/0268707 A1* 10/2009 Pani et al. .................. 370/345
2010/0192035 A1   7/2010 Sagfors et al.
2012/0057476 A1*  3/2012 Chan et al. ................. 370/252
2014/0233541 A1*  8/2014 Kim et al. .................. 370/336

OTHER PUBLICATIONS

3rd Generation Partnership Project. "Way Forward on Uplink Coverage Enhancement." TSG-RAN WG1 Meeting #68, R1-120900, Feb. 6-10, 2012, pp. 1-2, Dresden, Germany.
3rd Generation Partnership Project. 3GPP TS 36.321 V10.5.0 (Mar. 2012). 3rd Generation Partnership Project; Technical Specification Group Radio Access Network; Evolved Universal Terrestrial Radio Access (E-UTRA); Medium Access Control (MAC) protocol specification (Release 10). Mar. 2012, pp. 1-54.

* cited by examiner

METHOD AND APPARATUS FOR DYNAMIC CONTROL OF TTI BUNDLING SIZES

RELATED APPLICATIONS

This application claims priority from the U.S. provisional patent application filed on 11 May 2012 and assigned App. No. 61/645,848, and which is incorporated herein by reference.

TECHNICAL FIELD

The present invention generally relates to wireless communication networks and particularly relates to networks that use dynamic bundling of Transmission Time Intervals (TTIs).

BACKGROUND

Coverage represents a primary requirement of cellular radio communication systems. For example, the desired service coverage and quality sets limits on how sparsely network radio nodes can be deployed and where they can be deployed. Coverage requirements therefore directly affect deployment costs.

In the Long Term Evolution (LTE) standard defined by the Third Generation Partnership Project (3GPP), coverage is an important design parameter. For example, voice services retain their continued importance in LTE networks, where voice services typically use equal (data) rates in both the uplink and the downlink. However, because of the lower transmit power limitations of typical mobile devices, the uplink typically limits coverage.

Release 8 (Rel. 8) of the LTE standard introduced Transmission Time Interval (TTI) bundling as a technique for improving voice coverage using Voice-over-IP (VoIP) services. Rather than relying on Hybrid Automatic Repeat reQuest (HARQ) processing to trigger retransmission of unsuccessfully received VoIP packets, TTI bundling allows a mobile device to send the same packet over a "bundle" of consecutive TTIs, e.g., four TTIs. More particularly, the mobile device sends the same packet in each one of the bundled TTIs, but uses a different error detection and correction coding in each TTI, thus maximizing the ability of the network to successfully recover the packet from the bundled transmission.

Therefore, rather than relying on HARQ processing, with its attendant signaling overhead, a base station may activate TTI bundling for a given voice user, responsive to recognizing poor uplink reception conditions with respect to that user. In more detail, with TTI bundling, four uplink TTIs are bundled together using autonomous retransmissions. This technique effectively reduces the overhead of the transmissions, because the same header information is used in all bundled TTIs, rather than applying separate headers. The channel coding efficiency is also increased because of the use of longer code words.

With TTI bundling, an uplink grant is sent to a device (i.e., a UE or other wireless communication device being scheduled by the base station) four ms before the start of the bundle. The device then transmits one transport block using one redundancy version per subframe over four subframes. Correspondingly, the device expects HARQ feedback sixteen ms after the initial grant. If a negative feedback is received a non-adaptive retransmission is performed four ms after the feedback. For further TTI bundling details, the interested reader may refer to the 3GPP Technical Specification (TS) 36.321.

While TTI bundling is an efficient way for improving coverage for coverage-limited VoIP services, TTI bundling is not without certain drawbacks—see the 3GPP study item identified as R1-120900, "Way Forward on Uplink Coverage Enhancement," RAN 1#68 Dresden February 2012. One particular drawback arises because the most commonly used VoIP codecs generate one new data frame every twenty ms.

These twenty ms frames should be conveyed to the (network) receiver with the lowest possible delay. The allowed air interface delay for LTE is fifty ms, which limits the number of HARQ retransmissions available, given the maximum HARQ Round Trip Time (RTT) of sixteen ms. This circumstance does not permit single transport blocks to be used for the twenty ms frames, which lowers coverage to the case where a single transport block could be used for each twenty ms frame.

Multiple solutions have been proposed to improve the TTI bundling scheme of LTE Rel8 to avoid the above problems. Among these various proposals is the proposal that more TTIs be bundled together. This approach provides additional scheduling flexibility.

SUMMARY

In an example of the teachings disclosed herein, there are multiple signaling options available for triggering a bundled transmission by a wireless device, and a known association between the different signaling options and different TTI bundling sizes. A network node thus indicates to the wireless device which TTI bundling size is desired, based on choosing which signaling option it uses to trigger the bundled transmission. Such signaling allows for the use of variable TTI bundle sizes, i.e., dynamic control of the TTI bundle size used by the wireless device for transmission and yet does not impose signaling overhead or necessarily require new signaling messages or types. Higher layer signaling may be used to activate TTI bundling with implicit signaling then used to dynamically control the actual TTI bundle size used.

The desired TTI bundle size is signaled in some embodiments using the Redundancy Version (RV) indicated to the wireless device for the bundled transmission. As an example, an uplink grant signaling redundancy version 0 indicates a larger TTI bundle size than transmissions triggered by PHICH signaling or downlink grants indicating a different redundancy version. Different values of Radio Network Temporary Identifiers (RNTIs) also can be used to implicitly indicate different TTI bundle sizes. Of course, these are non-limiting examples.

More generally, in one or more embodiments there is a known or otherwise defined relationship between certain signaling options and corresponding TTI bundle sizes. This may be regarded in some sense as a mapping between signaling options, e.g., signaling types, formats, timing, and/or signaled values, and corresponding TTI bundles sizes. Such an arrangement allows the network to dynamically trigger use of different TTI bundling sizes in a robust yet efficient manner.

As an example, a network node is configured for operation in a wireless communication network, and is more particularly configured to implement a method for dynamically controlling the TTI bundle size used by a wireless device for a bundled transmission. The method performed by the network node includes determining a desired TTI bundle size to be used by the wireless device for the bundled transmission, and selecting a signaling option to be used for triggering the bundled transmission by the wireless device.

The signaling option selection is based on the desired TTI bundle size and a defined mapping between different signaling options among a number of signaling options and different TTI bundle sizes in a defined set of TTI bundle sizes. In other words, different signaling options map to different TTI bundle sizes, and this defined mapping is known at the network node and at the wireless device. Thus, the method advantageously includes indicating the desired TTI bundle size to the wireless device by triggering the bundled transmission using the selected signaling option.

The example network node, as configured to carry out the above method, includes one or more processing circuits— e.g., digital processing circuits such as a microprocessor or microcontroller, DSP, ASIC, FPGA, or other digital processing circuits that are configured to carry out the contemplated network-side processing. More generally, the example network node includes a communication interface configured for sending signaling to the wireless device, and one or more processing circuits operatively associated with the communication interface and configured to perform the above-described method, or variations of it. Such circuitry may be fixed or programmable, or may be a mix of both fixed and programmable circuitry.

Correspondingly, in an example mobile- or user-side method, a wireless device is configured to implement a method of dynamically selecting a TTI bundle size to be used for sending a bundled transmission. The method includes receiving signaling from a network node to trigger the bundled transmission, determining which signaling option from among a number of different signaling options was used by the network node for sending the signaling to trigger the bundled transmission, and identifying which TTI bundle size from among a defined set of TTI bundle sizes is associated with the signaling option.

The identification represents an application or usage of the earlier-described mapping, wherein the wireless device determines which TTI bundle size is implied from the signaling option that was used to trigger the bundled transmission according to a defined mapping between the different signaling options and different ones in a defined set of TTI bundle sizes. Thus, the method further includes the wireless device selecting the identified TTI bundle size as a selected TTI bundle size to be used by the wireless device for the bundled transmission, and sending the bundled transmission using the selected TTI bundle size.

The wireless device for example includes one or more processing circuits—e.g., digital processing circuits such as a microprocessor, microcontroller, DSP, ASIC, FPGA, or other digital processing circuitry that is configured to carry out the contemplated device-side method. Such circuitry may be fixed or programmable, or may be a mix of both fixed and programmable circuitry. In some embodiments, for example, the wireless device includes a communication interface configured to send and receive signaling to and from a network node in the wireless communication network, and one or more processing circuits that are operatively associated with the communication interface and configured to perform the above-described device-side method.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1A:
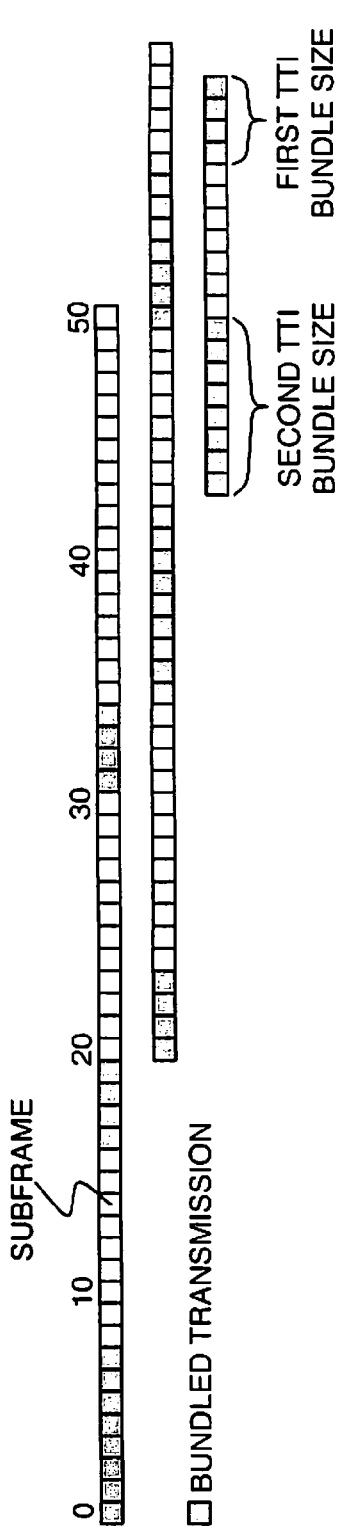
FIGS. 1A and 1B illustrate examples of TTI bundling with dynamically varying numbers of bundled subframes per transmission attempt, as provided for by the methods and apparatuses taught herein.
Figure 1B:
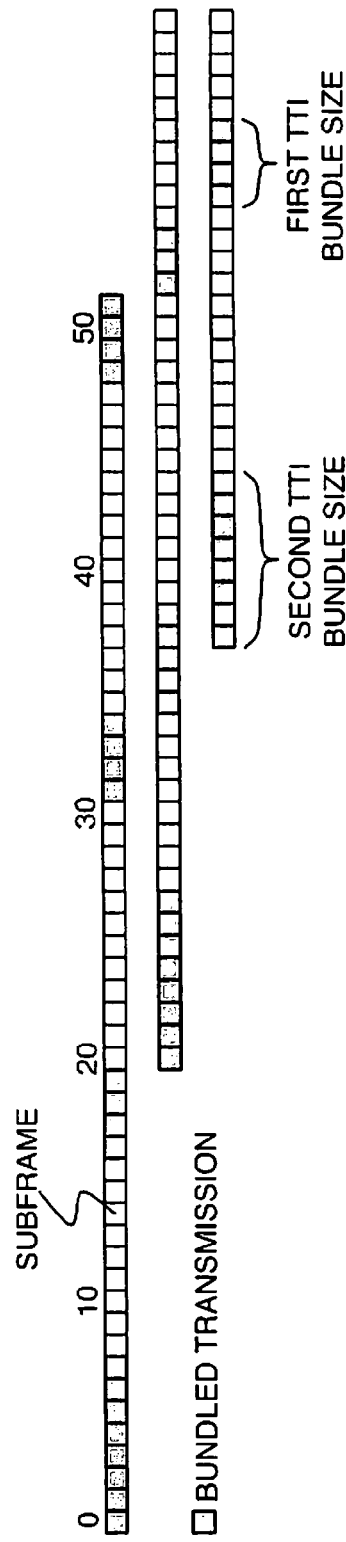

FIGS. 1A and 1B illustrate the use of variable TTI bundle sizes, and it will be understood that the teachings herein provide a robust and highly efficient mechanism for dynamically controlling the TTI bundling size used by a wireless device for transmission. In particular, one aspect of the teachings herein is providing an efficient form of signaling for dynamically varying the TTI bundle sizes used by wireless devices, as illustrated by way of non-limiting example in FIGS. 1A and 1B.

As noted earlier herein, TTI bundling was introduced in LTE Rel8 and was intended to provide coverage enhancements primarily for VoIP. At that timeframe a typical allowed latency budget for VoIP was 80 ms, giving the current scheme, with 4 bundled TTIs with a round trip time of 16 ms, good performance utilizing up to 20 TTIs per VoIP frame. Currently, however, a more commonly used latency budget for VoIP evaluations is ~50 ms, which restricts the current TTI bundling scheme to only 12 (50 ms latency) or 16 TTIs (52 ms latency), resulting in a energy combining loss of 2.2 or 1.0 dB respectively. On top of the energy loss there is also a diversity loss. On the other hand, simply extending the TTI bundle size may reduce performance because of reduced time-correlation over the bundle.

Thus, there are benefits to using a variable TTI bundle size, e.g., where an extended bundle size is used only for a subset of the transmissions by a device. That is, such as is suggested by the variable TTI bundle sizes shown in FIGS. 1A and 1B, it is possible to utilize 20 TTIs, and even more, within the latency budget.

Figure 2:
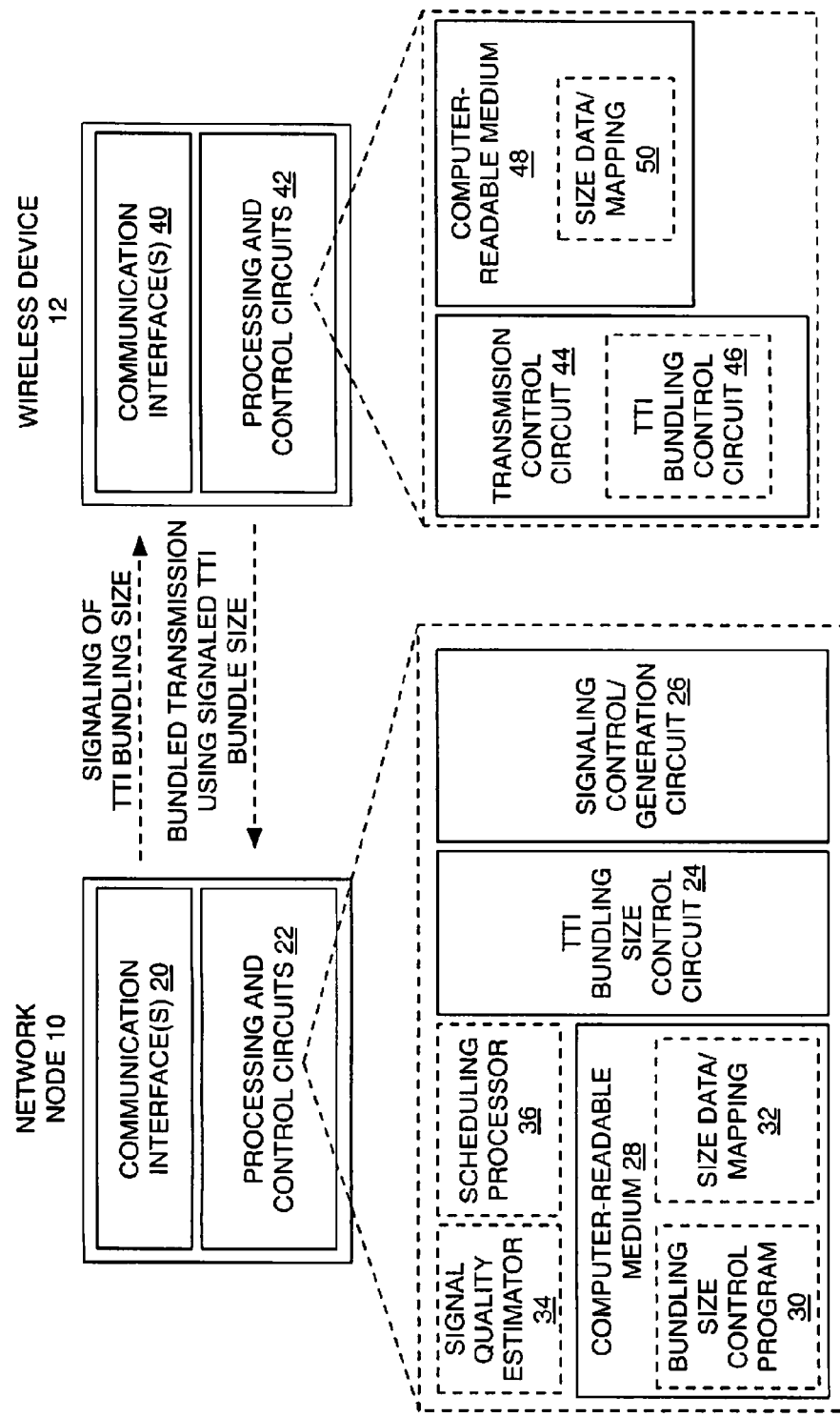
FIG. 2 is a diagram of one embodiment of a network node, e.g., a base station, and a wireless communication device, e.g., a UE.

With the example scenarios of FIGS. 1A and 1B in mind, FIG. 2 introduces embodiments of a network node 10 and a wireless device 12, both of which are configured according to the teachings herein relating to advantageous signaling and corresponding dynamic control of TTI bundling sizes.

As a non-limiting example, the network node 10 comprises an eNodeB configured for operation in a Long Term Evolution, "LTE", wireless communication network. Correspondingly, the wireless device 12 comprises a UE or other communication device configured for operation in LTE networks. Of course, these are illustrative examples and, more broadly, the network node 10 is configured for operation in a given wireless communication network which uses TTI bundling. In particular, the network node 10 is configured to dynamically control the TTI bundle size used by the wireless device 12 for a bundled transmission by the wireless device 12. Of course, the network node 10 may perform such bundling size control and related signaling for any number of wireless devices 12.

The network node 10 comprises a communication interface 20 that is configured for sending signaling to the wireless device 12, and one or more processing circuits 22 that are operatively associated with the communication interface 20. The processing circuit(s) 22 are configured to: determine a desired TTI bundle size to be used by the wireless device 12 for the bundled transmission; select a signaling option to be used for triggering the bundled transmission by the wireless device 12, based on the desired TTI bundle size and a defined mapping between different signaling options among a number of signaling options and different TTI bundle sizes in a defined set of TTI bundle sizes, where the defined mapping is known at the network node 10 and at the wireless device 12; and indicate the desired TTI bundle size to the wireless device 12 by triggering the bundled transmission using the selected signaling option.

In the illustrated example, which may comprise physical circuitry and/or functional circuitry realized via programmatic configuration in one or more digital processing circuits, the processing circuit(s) 22 include: a TTI bundling size control circuit 24, a signaling control/generation circuit 26, a computer-readable medium 28 storing computer program instructions comprising a bundling size control program 38 and mapping information 32 that defines the associations between different TTI bundling sizes and different ones of the available signaling options for triggering a bundled transmission by a wireless device 12. Non-limiting examples of a computer-readable medium as contemplated herein include EEPROM or FLASH memory, disk-based storage, etc.

Figure 3:
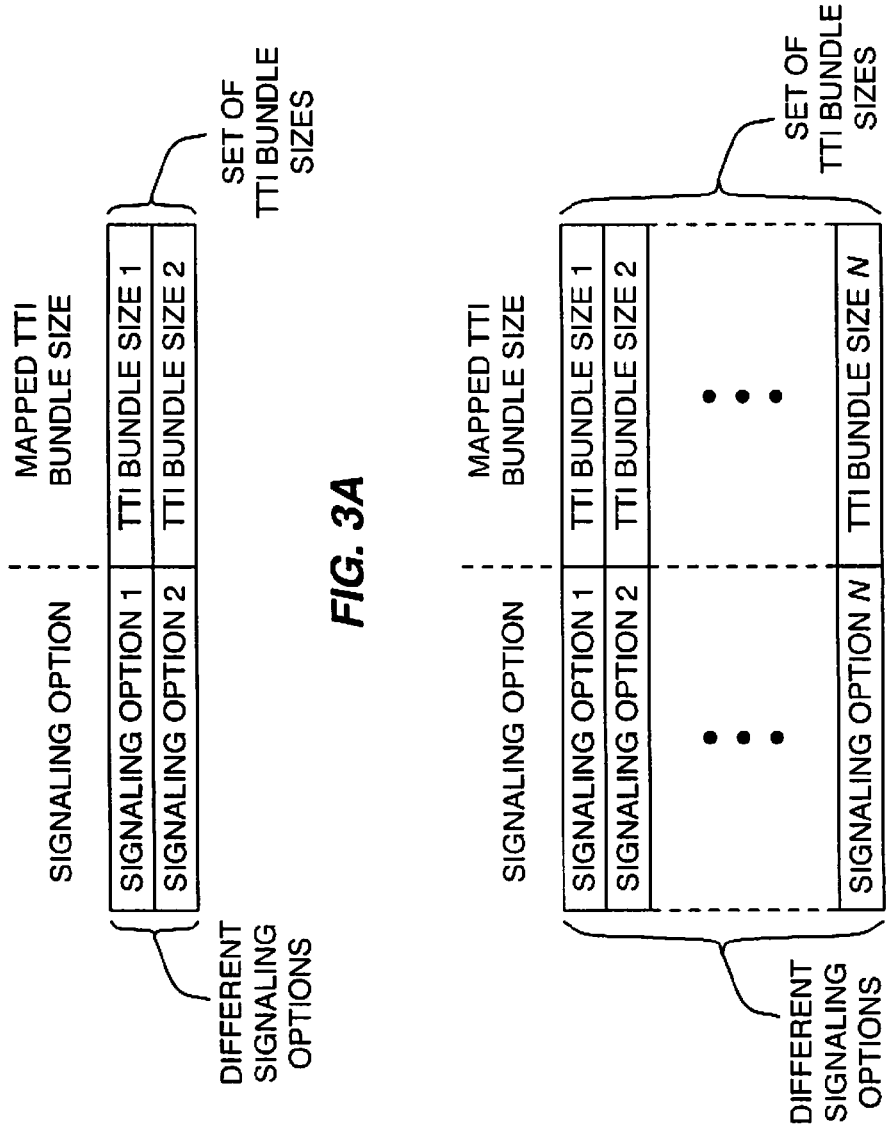
FIGS. 3A and 3B are diagrams of example data structures embodying a mapping between different signaling options available for triggering a bundled transmission and different TTI bundle sizes.

FIGS. 3A and 3B illustrate two example mappings. In FIG. 3A, there are two TTI bundle sizes defined, e.g., SIZE 1 and SIZE 2, and two different signaling options for triggering a bundled transmission by the wireless device 12, e.g., OPTION 1 and OPTION 2. The SIZE 1 value is implicitly signaled by triggering the bundled transmission using signaling OPTION 1, and the SIZE 2 value is implicitly signaled by triggering the bundled transmission using OPTION 2. The same or similar logic applies to the mapping table shown in FIG. 3B, but extended to any number of N signaling options and a corresponding N TTI bundle sizes. Of course, it is contemplated herein that more than one signaling option can map to the same TTI bundle size, e.g., a first signaling option maps to a first TTI bundle size, while all other available signaling options map to a second TTI bundle size.

In the example circuit arrangement shown in FIG. 2, the TTI bundling size control circuit 24 determines the TTI bundle size for an upcoming bundled transmission by a wireless device 12, e.g., based on corresponding signal quality information from a signal quality estimation circuit 34 and/or based on user scheduling information from a scheduling processor circuit 36. In a variation of this processing, the scheduling processor circuit 36 selects the TTI bundling size to be used, based on its determination of an optimal or preferred TTI bundling size for the wireless device 12, possibly in consideration of ongoing scheduling of multiple users.

Regardless, the signaling control/generation circuit 26 generates signaling corresponding to the desired TTI bundle size, for sending to the wireless device 12 via the communication interface(s) 20. Other circuit arrangements are contemplated and these details should be understood as non-limiting examples intended to aid understanding of the contemplated selection and signaling of a desired TTI bundle size.

Regardless of their particular functional arrangement, the processing circuit(s) 22 are configured to determine the desired TTI bundle size, for example, by selecting a defined TTI bundle size from the defined set of TTI bundle sizes based on knowledge of the reception conditions associated with the wireless device 12. The reception conditions are represented, for example, by one or more signal quality measurements or estimations as provided by the signal quality estimation circuits 34.

In a further example, the processing circuit(s) 22 are configured to indicate one or both of the defined set of TTI bundle sizes and the defined mapping to the wireless device 12 using signaling sent using a higher-layer network protocol than is used for triggering the bundled transmission using the selected signaling option. For example, the mapping tables—data structures—exemplified in the illustrations of FIGS. 3A and 3B—may be sent to the wireless device 12 as part of the initial connection procedure, or whenever needed, using Radio Resource Control, "RRC", signaling. Once the wireless device 12 has the mapping information, the network node 10 dynamically changes TTI bundle sizes advantageously using implicit signaling, wherein the particular signaling option used by the network node 10 for triggering a given bundled transmission by the wireless device 12 implicitly indicates to the desired TTI bundle size that the wireless device 12 should use for the bundled transmission.

In a non-limiting example of the signaling options that are used in at least some embodiments, the processing circuit(s) 22 are configured to select the signaling option based on one of: choosing which Redundancy Version Indicator, "RVI", value to include in an uplink scheduling grant used for triggering the bundled transmission, wherein different RVI values indicate different TTI bundle sizes, according to the defined mapping; choosing between sending an uplink scheduling grant or a Non-Acknowledgment, "NACK", signal to trigger the bundled transmission, wherein uplink scheduling grants indicate one TTI bundle size and NACK signals indicate another TTI bundle size, according to the defined mapping; choosing which Radio Network Temporary Identifier, "RNTI", value to use for sending an uplink scheduling grant used for triggering the bundled transmission, wherein different RNTI values indicate different TTI bundle sizes, according to the defined mapping; choosing which transmission subframe to use for sending an uplink scheduling grant used for triggering the bundled transmission, wherein different transmission subframe indexes indicate different TTI bundle sizes, according to the defined mapping; and choosing which bundle size indicator value to include in an uplink scheduling grant to be sent for triggering the bundled transmission, wherein different bundle size indicator values indicate different TTI bundle sizes, according to the defined mapping.

The defined mapping in one or more contemplated embodiments associates a first RVI value with a first TTI bundle size and a second RVI value with a second TTI bundle size. Correspondingly, the processing circuits 22 are configured to choose which RVI value to include in a scheduling grant sent to a wireless device 12, by choosing the first or the second RVI value in dependence on whether the first or the second TTI bundle size is the desired TTI bundle size.

In another contemplated configuration, the defined mapping associates uplink scheduling grants with a first TTI bundle size, and NACK signals with a second TTI bundle size. The processing circuits 22 are configured to choose between sending the uplink scheduling grant or the NACK signal to trigger a bundled transmission from the wireless device 12, by choosing to send the uplink scheduling grant if the first TTI bundle size is the desired TTI bundle size, or choosing to send the NACK signal if the second TTI bundle size is the desired TTI bundle size. In an application of this approach, consider the case where a retransmission from the wireless device 12 is needed. The network node 10 controls whether the retransmission by the wireless device 12 uses a first or a second TTI bundle size by choosing whether to trigger the retransmission by sending NACK signaling for the corresponding earlier transmission for which retransmission is needed, or by sending a new uplink scheduling grant.

The defined mapping also may be configured to associate a first RNTI type or value, or first RNTI types or values, with a first TTI bundle size and to associate a second RNTI type or value, or second RNTI types or values, with a second TTI bundle size. For example, cell-specific RNTIs, "C-RNTIs", are first RNTI types or values associated with a first TTI bundle size and Semi-Persistent Scheduling, "SPS", cell-specific RNTIs, "SPS C-RNTIs", are second RNTI types or values associated with a second TTI bundle size. In such cases, the processing circuits 22 are configured to choose which RNTI to use for sending an uplink scheduling grant to a particular wireless device 12, based on choosing a C-RNTI if the first TTI bundle size is the desired TTI bundle size, or choosing a SPS C-RNTI if the second TTI bundle size is the desired TTI bundle size.

In another example configuration, a first subframe index is associated with a first TTI bundle size and a second subframe index is associated with a second TTI bundle size. Here, the subframe indexes will be understood as corresponding to recurring instances or intervals of time according to the radio link timing of the air interface used for communicating with the wireless device 12. In such embodiments, the processing circuits 22 are configured to choose which transmission subframe to use for sending the uplink scheduling grant used for triggering a bundled transmission from a given wireless device 12, based on choosing the first subframe index if the first TTI bundle size is the desired TTI bundle size, or choosing the second subframe index if the second TTI bundle size is the desired TTI bundle size.

In another example configuration, uplink scheduling grants include one or more explicit bits used for indicating the desired TTI bundle size from among the defined set of TTI bundle sizes. Correspondingly, the processing circuits 22 are configured to choose which bundle size indicator value to include in an uplink scheduling grant to be sent to a given wireless device 12 for triggering a bundled transmission by that wireless device 12. That is, the processing circuits 22 set the one or more explicit bits comprising the TTI bundle size indicator according to the desired TTI bundle size.

Figure 4:
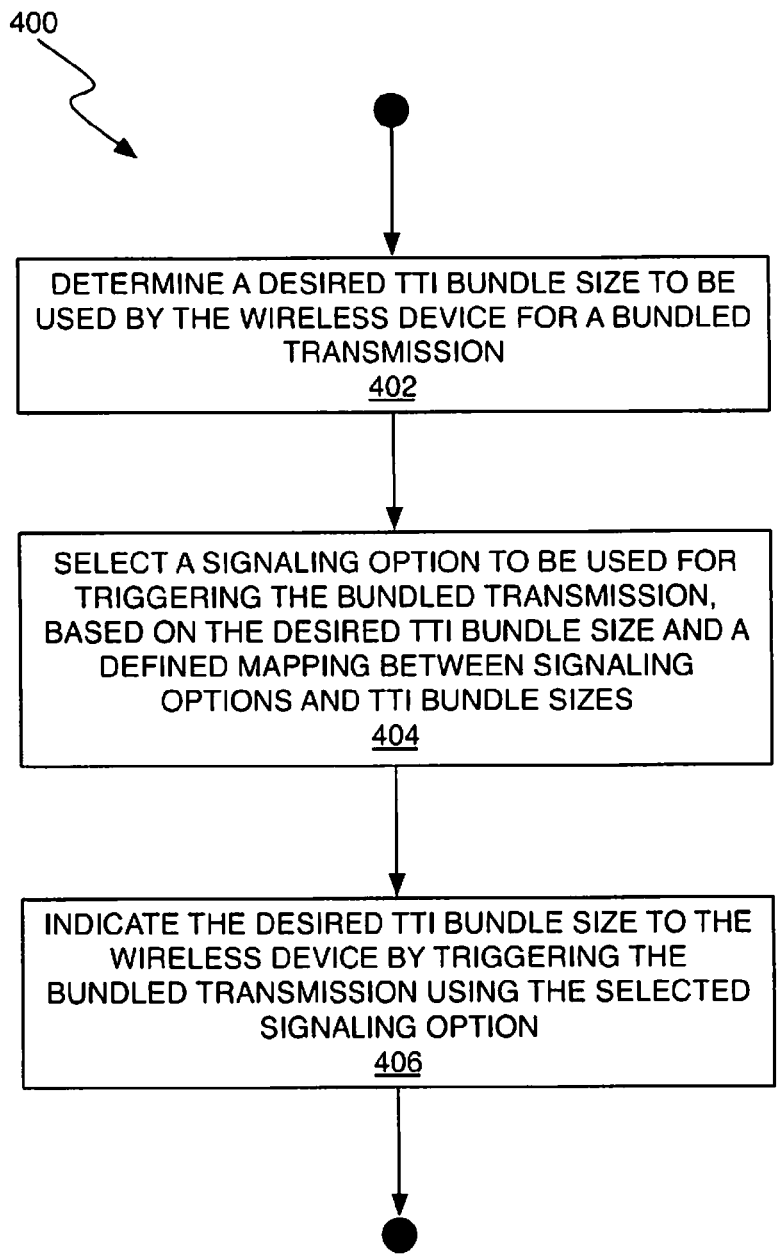
FIG. 4 is a logic flow diagram of one embodiment of a method of processing at a network node, for dynamically controlling the TTI bundle size used by a wireless device.

FIG. 4 illustrates a method 400 broadly corresponding to the example processing described above for the network node 10, for dynamically controlling a TTI bundle size used by a wireless device 12 for a bundled transmission by the wireless device 12. The illustrated method 400 includes: determining (Block 402) a desired TTI bundle size to be used by the wireless device 12 for the bundled transmission, e.g., based on uplink signal quality for the wireless device 12 and/or ongoing user scheduling considerations; selecting (Block 404) a signaling option to be used for triggering the bundled transmission by the wireless device 12, based on the desired TTI bundle size and a defined mapping between different signaling options among a number of signaling options and different TTI bundle sizes in a defined set of TTI bundle sizes, where the defined mapping is known at the network node 10 and at the wireless device 12; and indicating (Block 406) the desired TTI bundle size to the wireless device 12 by triggering the bundled transmission using the selected signaling option.

Such implicit signaling must, of course, be understood by the targeted wireless device 12, an example of which appears in FIG. 2. The illustrated wireless device 12 is configured for operation in a wireless communication network and comprises: a communication interface 40 configured to send and receive signaling to and from a network node 10 in the wireless communication network; and one or more processing circuits 42 operatively associated with the communication interface 40.

The processing circuits 42 are configured to: determine which signaling option from among a number of different signaling options was used by the network node 10 for sending signaling to trigger a bundled transmission by the wireless device 12; identify which TTI bundle size from among a defined set of TTI bundle sizes is associated with the signaling option used, based on a defined mapping between the different signaling options and different ones in a defined set of TTI bundle sizes; select the identified TTI bundle size as a selected TTI bundle size to be used by the wireless device 12 for the bundled transmission; and perform the bundled transmission, via the communication interface 40, using the selected TTI bundle size.

Various implementations for the processing circuits 42 are contemplated and FIG. 2 illustrates one contemplated arrangement in which the processing circuits 42 at least functionally include a transmission control circuit 44, including a TTI bundling control circuit 46, and a computer-readable medium 48, such as a memory circuit, storing size data/mapping information 50—referred to as "mapping information 50" for convenience—that associates different TTI bundling sizes with different signaling options that may be used by the network node 10 for triggering a bundled transmission by the wireless device 12.

The processing circuits 42 comprise, for example, one or more dedicated circuits or programmatically-configured circuits, or a mix of both. In at least one implementation, the computer-readable medium 48 also stores computer program instructions that, when executed by the processing circuits 42, implement the TTI bundling control described herein.

As noted before, the network node 10 may send the mapping information 50, or the data used to generate the mapping information, to the wireless device 12. Thus, the processing circuits 42 in an example configuration are configured to receive, via the communication interface 40, configuration data from the network node 10, indicating one or both of the defined set of TTI bundle sizes and the defined mapping.

In an example of the above, one or more processing circuits 42 are configured to receive the configuration data as RRC protocol signaling. The mapping information 50 also may be wholly or partly preconfigured in the wireless device 12, e.g., such as where there are broadly agreed upon TTI bundling sizes to choose from and correspondingly agreed associations between these defined TTI bundling sizes and the signaling options to be used for retriggering a bundled transmission by the wireless device 12.

Regardless of how the processing circuits 42 obtain the mapping information 50, in one or more embodiments they are configured to determine which signaling option was used based on being configured to: determine which RVI value was included in an uplink scheduling grant sent to the wireless device 12 as the signaling to trigger a bundled transmission, wherein different RVI values indicate different TTI bundle sizes, according to the mapping information 50; or determine whether an uplink scheduling grant or a NACK signal was sent as the signaling to trigger the bundled transmission, wherein uplink scheduling grants indicate one TTI bundle size and NACK signals indicate another TTI bundle size, according to the mapping information 50; or determine which RNTI value was used for sending an uplink scheduling grant as the signaling to trigger the bundled transmission, wherein different RNTI values indicate different TTI bundle sizes, according to the mapping information 50; or determine which transmission subframe was used for sending an uplink scheduling grant as the signaling to trigger the bundled transmission, wherein different transmission subframe indexes indicate different TTI bundle sizes, according to the mapping information; or determine which bundle size indicator value was included in an uplink scheduling grant sent as the signaling to trigger the bundled transmission, wherein different bundle size indicator values indicate different TTI bundle sizes, according to the mapping information 50.

In an example based on the use of subframe index selections as implicitly signaling a desired TTI bundle size, the processing circuits 42 of the wireless device 12 In are configured to use a modulus operation, e.g., the subframe index value mod 3 indicates to the wireless device 12 which TTI bundling size to select from a set of three different bundling sizes. In such an example, the mapping information may comprise this index mapping "rule". Of course, the "mod 3" example is non-limiting and other mapping functions are contemplated.

Figure 5:
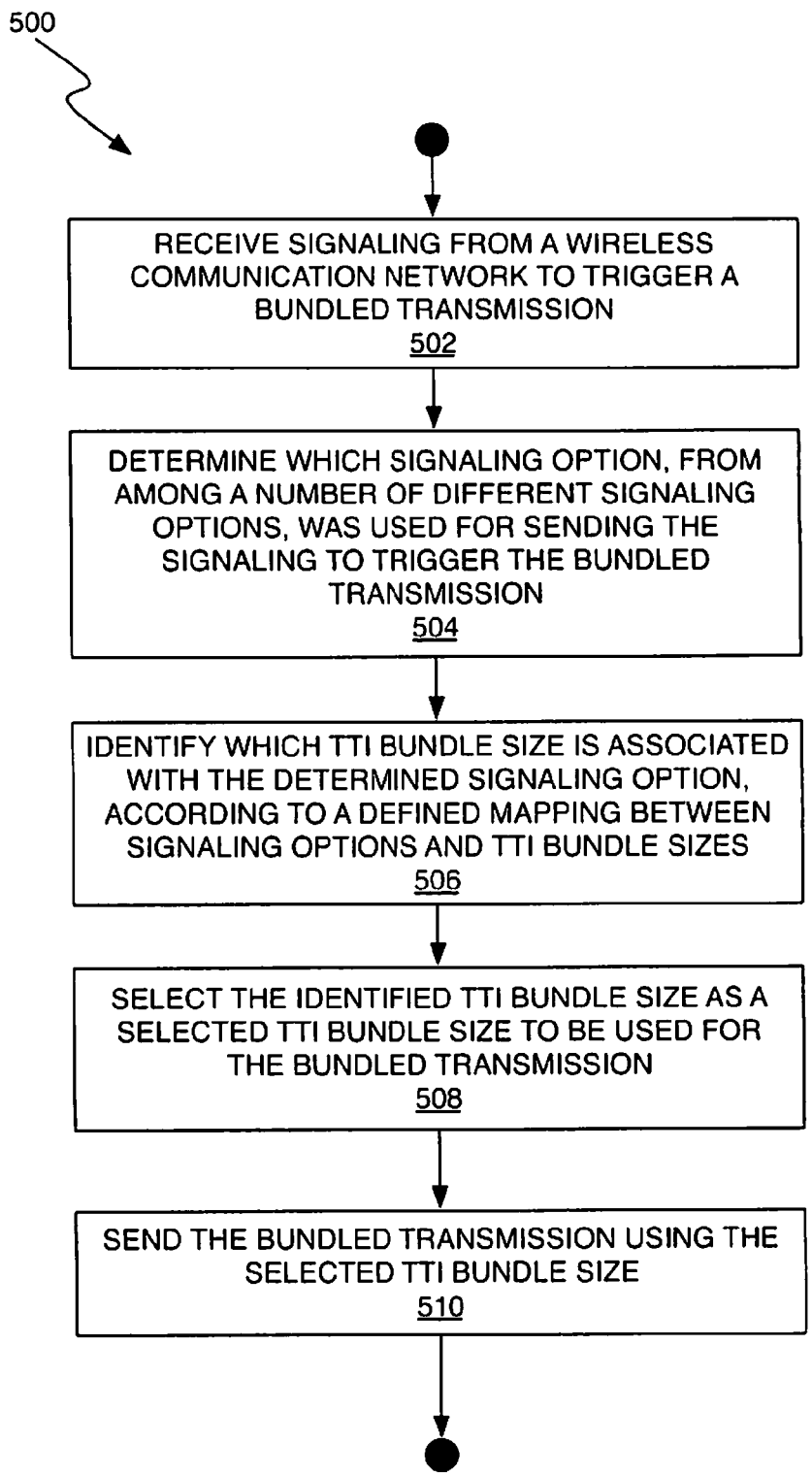
FIG. 5 is a logic flow diagram of one embodiment of a method of processing at a wireless device, for dynamically controlling the TTI bundle size used by the wireless device, based on the signaling option used to trigger a bundled transmission.

With the above mapping-based implicit signaling in mind, FIG. 5 illustrates a method 500 performed by the processing circuits 42 of the wireless device 12. According to the example processing, the method 500 allows the wireless device 12 to dynamically select a TTI bundle size to be used for sending a bundled transmission, and it includes: receiving (Block 502) signaling from a network node 10 to trigger the bundled transmission; determining (Block 504) which signaling option from among a number of different signaling options was used by the network node 10 for sending the signaling to trigger the bundled transmission; identifying (Block 506) which TTI bundle size from among a defined set of TTI bundle sizes is associated with the signaling option, according to a defined mapping between the different signaling options and different ones in a defined set of TTI bundle sizes; selecting (Block 508) the identified TTI bundle size as a selected TTI bundle size to be used by the wireless device 12 for the bundled transmission; and sending (Block 510) the bundled transmission using the selected TTI bundle size.

Which signaling options are used in the implicit signaling scheme contemplated herein may be varied as function of complexity and performance considerations. For example, in a case where there are two defined TTI bundle sizes, SIZE 1 and SIZE 2, the RVI indicated in a dynamic (uplink) grant controls the TTI bundle size selection made by a User Equipment, "UE", or other wireless device 12 targeted by the grant. As one example, if the dynamic grant indicates redundancy version 0 (zero), the wireless device 12 selects SIZE 2 for a bundled transmission. For transmissions triggered in other ways, such as a negative HARQ feedback on the Physical Hybrid-ARQ Channel (PHICH), or a grant indicating a redundancy version other than zero, the wireless device 12 selects SIZE 1 as the size of TTI bundling to be used for the triggered transmission.

Such operations can also be applied to a semi persistent scheduling grant, where the first transmission has one bundling size and the following bundling sizes are determined based on whether they are triggered by PHICH feedback (HARQ feedback) or dynamic grants (and, in the case of dynamic grant triggering, the indicated redundancy version). One contemplated extension to such embodiments is the mapping of multiple (two or more different redundancy version values) to respective ones among multiple (two or more) TTI bundle sizes, e.g., {BUNDLE_SIZE_0, BUNDLE_SIZE_1, BUNDLE_SIZE_2, BUNDLE_SIZE_3}.

Further, in one or more embodiments contemplated herein, the number of subframes used for bundling is determined by the value of the RNTI related to a grant received at a targeted wireless device 12. As an example, an uplink grant received with a device's C-RNTI corresponds to a given bundle size, e.g., SIZE 1, and a grant received with a SPS C-RNTI corresponds to a different bundle size, e.g., SIZE 2 This example will be understood as one implementation of a broader embodiment wherein different RNTIs map to different TTI bundle sizes, whether according to a fixed mapping definition known a priori to network nodes 10 and wireless devices 12, or according to a dynamically configured mapping, which can be signaled, e.g., at connection setup. A network node 10 thus dynamically controls the TTI bundling size selected by a given wireless device 12 based on the RNTI value included in the uplink scheduling grant sent to the wireless device 12.

In cases where the different signaling options comprise different values or combinations of values of explicit bits carried in Downlink Control Information, "DCI", sent to a targeted wireless device 12, the mapping information 50 at the wireless device 12 allows the wireless device 12 to map bit values, as flags or binary combinations, to respective bundling size selections in a predefined or dynamically configured set of TTI bundling sizes. If two bundle sizes are targeted, such can be realized by applying a CRC mask to an existing DCI. For example, in a case where TTI bundling is enabled by high-layer signaling, sending DCI with mask 0 indicates that the wireless device 12 should select SIZE 1, for example, whereas DCI with mask 1 indicates that the wireless device 12 should select SIZE 2

All of the above examples will be recognized as providing a number of advantages. Among these advantages is the ability for the network to dynamically control the TTI bundling size selections made by devices based on robust yet efficient signaling, and particularly in allowing the control of TTI bundling size without requiring new signaling.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at network node in a wireless communication network, for dynamically controlling a Transmission Time Interval (TTI) bundle size used by a wireless device for a bundled transmission by the wireless device, the method comprising:

determining a desired TTI bundle size to be used by the wireless device for the bundled transmission;

selecting a signaling option to be used for triggering the bundled transmission by the wireless device, based on the desired TTI bundle size and a defined mapping between different signaling options among a number of signaling options and different TTI bundle sizes in a defined set of TTI bundle sizes, wherein the defined mapping is known at the network node and at the wireless device, and wherein selecting the signaling option includes one of:

choosing which Redundancy Version Indicator (RVI) value to include in an uplink scheduling grant used for triggering the bundled transmission, wherein different RVI values indicate different TTI bundle sizes, according to the defined mapping;

choosing between sending an uplink scheduling grant or a Non-Acknowledgment (NACK) signal to trigger the bundled transmission, wherein uplink scheduling grants indicate one TTI bundle size, and NACK signals indicate another TTI bundle size, according to the defined mapping;

choosing which Radio Network Temporary Identifier (RNTI) type or value to use for sending an uplink scheduling grant used for triggering the bundled transmission, wherein different RNTI types or values indicate different TTI bundle sizes, according to the defined mapping;

choosing which transmission subframe to use for sending an uplink scheduling grant used for triggering the bundled transmission, wherein different transmission subframe indexes indicate different TTI bundle sizes, according to the defined mapping; and choosing which bundle size indicator value to include in an uplink scheduling grant to be sent for triggering the bundled transmission, wherein different bundle size indicator values indicate different TTI bundle sizes, according to the defined mapping; and indicating the desired TTI bundle size to the wireless device by triggering the bundled transmission using the selected signaling option.

2. The method of claim 1, wherein determining the desired TTI bundle size comprises selecting a defined TTI bundle size from the defined set of TTI bundle sizes based on knowledge of the reception conditions associated with the wireless device, as determined from one or more signal quality estimation circuits in the network node.

3. The method of claim 1, further comprising indicating one or both of the defined sets of TTI bundle sizes and the defined mapping to the wireless device using signaling sent using a higher-layer network protocol than used for triggering the bundled transmission using the selected signaling option.

4. The method of claim 3, wherein indicating one or both of the defined sets of TTI bundle sizes and the defined mapping comprises sending Radio Resource Control (RRC) signaling to the wireless device.

5. The method of claim 1, wherein the defined mapping associates a first RVI value with a first TTI bundle size and a second RVI value with a second TTI bundle size, and wherein choosing which RVI value to include in the scheduling grant comprises choosing the first or the second RVI value in dependence on whether the first or the second TTI bundle size is the desired TTI bundle size.

6. The method of claim 1, wherein the defined mapping associates uplink scheduling grants with a first TTI bundle size and NACK signals with a second TTI bundle size, and wherein choosing between sending the uplink scheduling grant or the NACK signal to trigger the bundled transmission comprises choosing to send the uplink scheduling grant if the first TTI bundle size is the desired TTI bundle size, or choosing to send the NACK signal if the second TTI bundle size is the desired TTI bundle size.

7. The method of claim 1, wherein the defined mapping associates a first RNTI type or value with a first TTI bundle size and a second RNTI type or value with a second TTI bundle size, and wherein choosing which RNTI type or value to use for sending the uplink scheduling grant comprises choosing the first RNTI type or value if the first TTI bundle size is the desired TTI bundle size, or choosing the second RNTI type or value if the second TTI bundle size is the desired TTI bundle size.

8. The method of claim 1, wherein a first subframe index is associated with a first TTI bundle size and a second subframe index is associated with a second TTI bundle size, and wherein choosing which transmission subframe to use for sending the uplink scheduling grant used for triggering the bundled transmission comprises choosing the first subframe index if the first TTI bundle size is the desired TTI bundle size, or choosing the second subframe index if the second TTI bundle size is the desired TTI bundle size.

9. The method of claim 1, wherein uplink scheduling grants include one or more explicit bits used for indicating the desired TTI bundle size from among the defined set of TTI bundle sizes, and wherein choosing which bundle size indicator value to include in the uplink scheduling grant to be sent for triggering the bundled transmission comprises setting the one or more explicit bits according to the desired TTI bundle size.

10. A network node configured for operation in a wireless communication network, including dynamically controlling a Transmission Time Interval (TTI) bundle size used by a wireless device for a bundled transmission by the wireless device comprising:

a communication interface configured for sending signaling to the wireless device; and one or more processing circuits operatively associated with the communication interface and configured to:

determine a desired TTI bundle size to be used by the wireless device for the bundled transmission;

select a signaling option to be used for triggering the bundled transmission by the wireless device, based on the desired TTI bundle size and a defined mapping between different signaling options among a number of signaling options and different TTI bundle sizes in a defined set of TTI bundle sizes, wherein the defined mapping is known at the network node and at the wireless device, wherein the signaling option includes one of:

choosing which Redundancy Version Indicator (RVI) value to include in an uplink scheduling grant used for triggering the bundled transmission, wherein different RVI values indicate different TTI bundle sizes, according to the defined mapping;

choosing between sending an uplink scheduling grant or a Non-Acknowledgment (NACK) signal to trigger the bundled transmission, wherein uplink scheduling grants indicate one TTI bundle size and NACK signals indicate another TTI bundle size, according to the defined mapping;

choosing which Radio Network Temporary Identifier (RNTI) type or value to use for sending an uplink scheduling grant used for triggering the bundled transmission, wherein different RNTI types or values indicate different TTI bundle sizes, according to the defined mapping;

choosing which transmission subframe to use for sending an uplink scheduling grant used for triggering the bundled transmission, wherein different transmission subframe indexes indicate different TTI bundle sizes, according to the defined mapping; and choosing which bundle size indicator value to include in an uplink scheduling grant to be sent for triggering the bundled transmission, wherein different bundle size indicator values indicate different TTI bundle sizes, according to the defined mapping; and indicate the desired TTI bundle size to the wireless device by triggering the bundled transmission using the selected signaling option.

11. The network node of claim 10, wherein the one or more processing circuits are configured to determine the desired TTI bundle size by selecting a defined TTI bundle size from the defined set of TTI bundle sizes based on knowledge of the reception conditions associated with the wireless device, as determined from one or more signal quality estimation circuits in the network node.

12. The network node of claim 10, wherein the one or more processing circuits are configured to indicate one or both of the defined set of TTI bundle sizes and the defined mapping to the wireless device using signaling sent using a higher-layer network protocol than is used for triggering the bundled transmission using the selected signaling option.

13. The network node of claim 12, wherein the one or more processing circuits are configured to indicate one or both of the defined set of TTI bundle sizes and the defined mapping by sending Radio Resource Control (RRC) signaling to the wireless device.

14. The network node of claim 10, wherein the defined mapping associates a first RVI value with a first TTI bundle size and a second RVI value with a second TTI bundle size, and wherein the one or more processing circuits are configured to choose which RVI value to include in the scheduling grant by choosing the first or the second RVI value in dependence on whether the first or the second TTI bundle size is the desired TTI bundle size.

15. The network node of claim 10, wherein the defined mapping associates uplink scheduling grants with a first TTI bundle size and NACK signals with a second TTI bundle size, and wherein the one or more processing circuits are configured to choose between sending the uplink scheduling grant or the NACK signal to trigger the bundled transmission by choosing to send the uplink scheduling grant if the first TTI bundle size is the desired TTI bundle size, or choosing to send the NACK signal if the second TTI bundle size is the desired TTI bundle size.

16. The network node of claim 10, wherein the defined mapping associates a first RNTI type or value with a first TTI bundle size and associates a second RNTI type or value with a second TTI bundle size, and wherein one or more processing circuits are configured to choose which RNTI type or value to use for sending the uplink scheduling grant by choosing the first RNTI type or value if the first TTI bundle size is the desired TTI bundle size, or choosing the second RNTI type or value if the second TTI bundle size is the desired TTI bundle size.

17. The network node of claim 10, wherein a first subframe index is associated with a first TTI bundle size and a second subframe index is associated with a second TTI bundle size, and wherein the one or more processing circuits are configured to choose which transmission subframe to use for sending the uplink scheduling grant used for triggering the bundled transmission by choosing the first subframe index if the first TTI bundle size is the desired TTI bundle size, or choosing the second subframe index if the second TTI bundle size is the desired TTI bundle size.

18. The network node of claim 10, wherein uplink scheduling grants include one or more explicit bits used for indicating the desired TTI bundle size from among the defined set of TTI bundle sizes, and wherein the one or more processing circuits are configured to choose which bundle size indicator value to include in the uplink scheduling grant to be sent for triggering the bundled transmission by setting the one or more explicit bits according to the desired TTI bundle size.

19. A wireless device configured for operation in a wireless communication network and comprising:
a communication interface configured to send and receive signaling to and from a network node in the wireless communication network; and
one or more processing circuits operatively associated with the communication interface and configured to:
determine which signaling option from among a number of different signaling options was used by the network node for sending signaling to trigger a bundled transmission by the wireless device, based on being configured to:
determine which Redundancy Version Indicator (RVI) value was included in an uplink scheduling grant sent to the wireless device as the signaling to trigger the bundled transmission, wherein different RVI values indicate different TTI bundle sizes, according to the defined mapping; or
determine whether an uplink scheduling grant or a Non-Acknowledgment (NACK) signal was sent as the signaling to trigger the bundled transmission, wherein uplink scheduling grants indicate one TTI bundle size and NACK signals indicate another TTI bundle size, according to the defined mapping; or
determine which Radio Network Temporary Identifier (RNTI) type or value was used for sending an uplink scheduling grant as the signaling to trigger the bundled transmission, wherein different RNTI types or values indicate different TTI bundle sizes, according to the defined mapping; or
determine which transmission subframe was used for sending an uplink scheduling grant as the signaling to trigger the bundled transmission, wherein different transmission subframe indexes indicate different TTI bundle sizes, according to the defined mapping; or
determine which bundle size indicator value was included in an uplink scheduling grant sent as the signaling to trigger the bundled transmission, wherein different bundle size indicator values indicate different TTI bundle sizes, according to the defined mapping;
identify which Transmission Time Interval (TTI) bundle size from among a defined set of TTI bundle sizes is associated with the signaling option used, based on a defined mapping between the different signaling options and different ones in a defined set of TTI bundle sizes;
select the identified TTI bundle size as a selected TTI bundle size to be used by the wireless device for the bundled transmission; and
perform the bundled transmission, via the communication interface, using the selected TTI bundle size.

20. The wireless device of claim 19, wherein the one or more processing circuits are configured to receive, via the communication interface, configuration data from the network node, indicating one or both of the defined set of TTI bundle sizes and the defined mapping.

21. The wireless device of claim 20, wherein the one or more processing circuits are configured to receive the configuration data as Radio Resource Control (RRC) protocol signaling.

22. A method at a wireless device of dynamically selecting a Transmission Time Interval (TTI) bundle size to be used for sending a bundled transmission, the method comprising:
receiving signaling from a network node to trigger the bundled transmission;
determining which signaling option from among a number of different signaling options was used by the network node for sending the signaling to trigger the bundled transmission, wherein determining which signaling option was used comprises one of:

determining which Redundancy Version Indicator (RVI) value was included in an uplink scheduling grant sent to the wireless device as the signaling to trigger the bundled transmission, wherein different RVI values indicate different TTI bundle sizes, according to the defined mapping;

determining whether an uplink scheduling grant or a Non-Acknowledgment (NACK) signal was sent as the signaling to trigger the bundled transmission, wherein uplink scheduling grants indicate one TTI bundle size and NACK signals indicate another TTI bundle size, according to the defined mapping;

determining which Radio Network Temporary Identifier (RNTI) type or value was used for sending an uplink scheduling grant as the signaling to trigger the bundled transmission, wherein different RNTI types or values indicate different TTI bundle sizes, according to the defined mapping;

determining which transmission subframe was used for sending an uplink scheduling grant as the signaling to trigger the bundled transmission, wherein different transmission subframe indexes indicate different TTI bundle sizes, according to the defined mapping; and determining which bundle size indicator value was included in an uplink scheduling grant sent as the signaling to trigger the bundled transmission, wherein different bundle size indicator values indicate different TTI bundle sizes, according to the defined mapping;

identifying which TTI bundle size from among a defined set of TTI bundle sizes is associated with the signaling option, according to a defined mapping between the different signaling options and different ones in a defined set of TTI bundle sizes;

selecting the identified TTI bundle size as a selected TTI bundle size to be used by the wireless device for the bundled transmission; and sending the bundled transmission using the selected TTI bundle size.

23. The method of claim 22, wherein further comprising receiving configuration data from the network node, indicating one or both of the defined set of TTI bundle sizes and the defined mapping.

24. The method of claim 23, wherein receiving the configuration data comprises receiving Radio Resource Control (RRC) protocol signaling indicating the configuration data.

* * * * *